R. A. MOORE.
ANTISKIDDING DEVICE FOR AUTOMOBILES.
APPLICATION FILED FEB. 17, 1910.
967,808.
Patented Aug. 16, 1910.
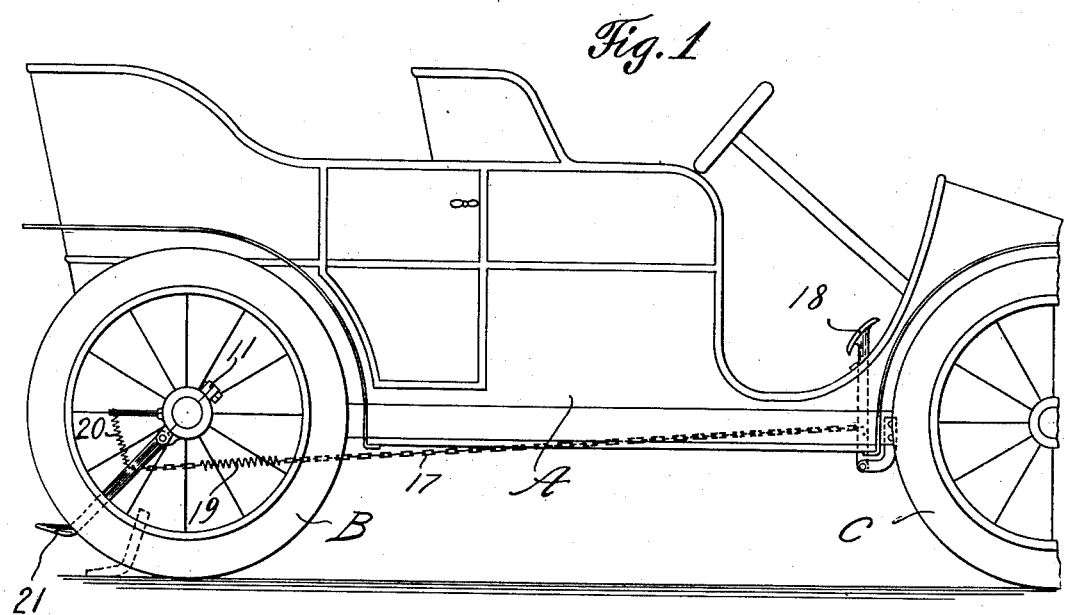
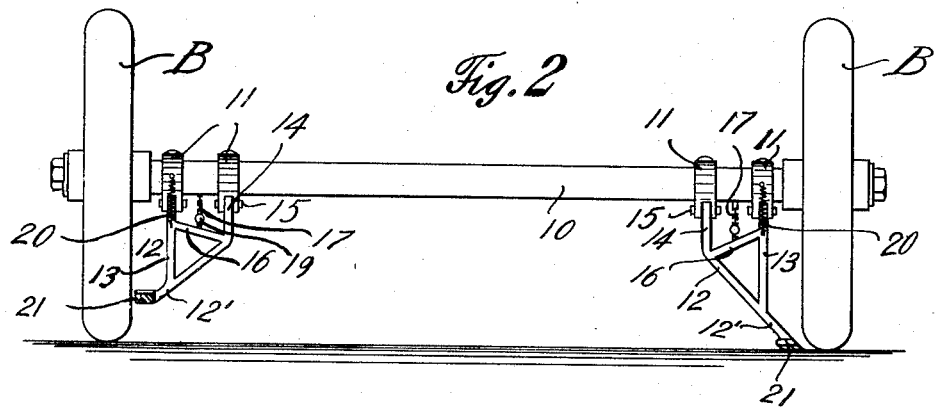
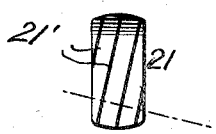
WITNESSES:
INVENTOR
BY
ATTORNEYS

UNITED STATES PATENT OFFICE.

ROBERT A. MOORE, OF CHICAGO, ILLINOIS, ASSIGNOR TO FREDERICK J. REVILLE, TRUSTEE, OF NEW YORK, N. Y.

ANTISKIDDING DEVICE FOR AUTOMOBILES.

967,808.

Specification of Letters Patent. Patented Aug. 16, 1910.

Application filed February 17, 1910. Serial No. 544,462.

*To all whom it may concern:*

Be it known that I, ROBERT A. MOORE, a citizen of the United States, residing at Chicago, in the county of Cook and State of Illinois, have invented certain new and useful Improvements in Antiskidding Devices for Automobiles, of which the following is a specification.

This invention relates to devices to counteract the tendency of automobiles to skid, thereby preventing accidents which commonly occur due to skidding.

For a full understanding of the invention reference is to be had to the following detail description and the accompanying drawings, in which—

Figure 1 is a side view of a conventional form of automobile to which the improvement is applied; Fig. 2 is a diagrammatic representation of the rear wheels and framework between the wheels to which the improvement is connected; Fig. 3 is a bottom plan view of a detail hereinafter described, and Fig. 4 is a transverse section of the same.

Throughout the following description and on the several figures of the drawings similar parts are referred to by like reference characters.

A indicates an automobile with the usual rear wheels B and front wheels C. The machine may be propelled in any suitable manner and if the rear axle is to be the propelling member for the rear wheels it may be incased in a tubular casing 10 or if the rear axle is stationary and the wheels are driven by other means the casing may not be required. To the rear casing or axle are connected a plurality of clamp members 11, preferably two adjacent each end of the axle, the same being spaced apart sufficiently to provide a strong abutment for a hanger 12 pivoted thereto. The hanger as viewed from the rear comprises a plurality of substantially parallel legs 13 and 14 through which a pair of bolts 15 or the like may be passed to secure the hanger to the pair of clamps 11. The hanger also includes a transverse or diagonal brace 16 which serves also as point of connection for a chain 17 connected at its opposite end to any suitable operating means such as a lever 18. It will be understood that a hanger and associated parts will be provided for each side of the vehicle, each operated by its own lever. A substantial spring 19 may be interposed between the ends of the chain 17 in order to prevent breakage of the hanger when in use, due to striking of a stone or other obstruction.

The hanger is intended to be suspended normally out of contact with the pavement by any suitable means such as a spring 20, strong enough for this purpose but not sufficiently strong to resist the proper operation of the device when intended. The spring 20 is connected at one end to the hanger and at its other end to any convenient stationary part of the vehicle.

The lower portion 12' of the hanger extends outwardly toward the adjacent wheel and terminates in a foot 21. The foot 21 or portion of the hanger which is adapted to engage with the pavement is arranged at an angle to the main part of the hanger and is substantially flat on the bottom except as hereinafter set forth. The angle at which the foot is disposed to the hanger is such that when the hanger is drawn upon by the lever 18 and chain 17 the foot will engage the pavement substantially throughout its length. As shown in the detail views the foot on the lower face is provided with a series of angular ridges 21'. These ridges are straight and parallel but arranged at an angle to the general length of the foot, and are directed substantially toward the front wheel on the opposite side of the vehicle. It being well known that the skidding of a vehicle is most dangerous while the machine is running at a rapid speed. If the machine should skid, say toward the right as viewed in Fig. 2 the hanger 12 should be depressed on that side of the machine and held substantially in contact with the pavement, so that the momentum of the machine in a forward direction will insure that the diagonally disposed ridges 21' will cause the machine or tend to cause the machine to approach again the proper path, the effect of the ridges being similar to the effect of a skate on ice with respect to the direction in which the machine will be propelled. With respect to the effect of the hanger and foot as to checking or stopping the vehicle from going in other directions than the direction indicated by the ridges will be similar to a ground brake. Furthermore, unlike certain other devices heretofore proposed for the general purpose of this device it will not materially damage the pavement by cutting or gouging into it.

The several parts of this device may be made of any suitable materials and the specific form and arrangement thereof may be varied somewhat without departing from the spirit of the invention hereinafter claimed.

I claim:—

1. In combination with an automobile including a body and a rear driving wheel, an anti-skidding device comprising a hanger, means to normally carry the hanger elevated from the bottom of the wheel, and means to depress the hanger so as to engage the roadway adjacent the bottom of the wheel, said hanger including a foot disposed at an angle to the main portion of the hanger and provided on its lower surface with a series of straight parallel ridges arranged at an angle to the general direction of the foot.

2. The hereindescribed anti-skidder for automobiles comprising a pair of clamps, a hanger including a pair of substantially parallel legs pivotally connected to said clamps, means to normally hold the hanger with its opposite end elevated from the ground, and foot operated means to draw the hanger down and forwardly into engagement with the ground, said hanger including a substantially straight foot disposed at an angle to the main portion of the hanger, said foot being provided with means tending to direct the vehicle back toward its proper path.

3. The combination with an automobile including a body, a frame and supporting wheels, of an anti-skidder associated with one of the rear wheels, said anti-skidder including a pair of clamps connected rigidly to said frame, a hanger including a pair of legs pivotally connected to said clamps, the lower portion of the hanger extending at an angle outwardly toward the wheel, means to normally suspend the hanger from the ground, the hanger including a sharp edged foot extending at an angle to the main portion of the hanger and adapted to resist skidding and to tend to propel the vehicle back to its normal path, and foot operated means connected with said vehicle body to draw the hanger down into engagement with the ground.

In testimony whereof I affix my signature in presence of two witnesses.

ROBERT A. MOORE.

Witnesses:
JOHN F. ROBB,
HUGH M. STERLING.